350-164
12/16/80 XR 4,239,338 SR

United States Patent [19] [11] 4,239,338
Borrelli et al. [45] Dec. 16, 1980

[54] SILVER HALIDE OPTICAL INFORMATION STORAGE MEDIA

[75] Inventors: Nicholas F. Borrelli, Elmira; Peter L. Young, Painted Post, both of N.Y.

[73] Assignee: Corning Glass Works, Corning, N.Y.

[21] Appl. No.: 86,813

[22] Filed: Oct. 22, 1979

[51] Int. Cl.[3] .......................... G02B 5/30; G01D 15/24

[52] U.S. Cl. .................................. 350/155; 346/135.1; 430/502; 430/508; 430/509; 430/932; 428/432; 428/913; 428/918; 350/164

[58] Field of Search ................. 350/DIG. 1, 157, 158, 350/164, 155; 428/432, 913, 918; 430/502, 508, 509, 932; 346/135.1

[56] References Cited

U.S. PATENT DOCUMENTS

| | | | |
|---|---|---|---|
| 3,316,096 | 4/1967 | Rasch et al. | 430/932 X |
| 3,740,761 | 6/1973 | Fechter | 346/135 |
| 3,853,386 | 12/1974 | Ritter et al. | 350/164 |
| 4,125,404 | 11/1978 | Araujo et al. | 160/54 |

*Primary Examiner*—John D. Welsh
*Attorney, Agent, or Firm*—Kees van der Sterre; Clinton S. Janes, Jr.

[57] ABSTRACT

Optically bleachable multilayer films containing additively colored silver chloride which exhibit high infrared transmittance and good bleaching sensitivity, and optical information storage media incorporating such films, are described.

12 Claims, 4 Drawing Figures

SILVER HALIDE OPTICAL INFORMATION STORAGE MEDIA

BACKGROUND OF THE INVENTION

The present invention is in the field of photosensitive films for optical information recording, and particularly relates to films which can exhibit both high levels of induced birefringence and relatively high transmittance at near infrared light wavelengths.

The fact that optical bleaching with polarized light can induce dichroism and birefringence in silver-containing silver halide photographic emulsions has long been known, being reported by Cameron and Taylor in "Photophysical Changes in Silver-Silver Chloride Systems", *J.O.S.A.* Vol. 24, Pages 316–330 (1934). More recently, analogous affects in silver halide-containing glasses have been observed, as reported by R. J. Araujo et al. in U.S. Pats. Nos. 4,125,404 and 4,125,405.

The particles responsible for the effects observed in these systems are referred to as additively colored silver halide crystals. These are silver halide crystals containing or associated with metallic silver, the silver metal acting to absorb visible light and being permanently bleachable by light of appropriate wavelength and intensity.

Other workers have reported optically induced dichroic effects in additively colored silver halide films, including V. P. Cherkashin in *Soviet Physics State,* Vol. 13, No. 1, pp. 264–265 (1971), and L. A. Ageev et al. in *Opt. Spektrosk,* Vol. 40, pp. 1024–1029 (June 1976). In our French Pat. No. 2,370,303 we disclose multilayer photosensitive films consisting of alternating layers of a dielectric acceptor such as a silver halide and a metal such as silver which are useful for optical information storage. These are light-absorbing films which can be optically bleached and which retain information relating to the color, intensity and polarization of the bleaching light.

Even though films of the type described in the foregoing studies comprise light-alterable silver halide crystals, their characteristics are substantially different from the characteristics of conventional silver halide photographic films. Additively colored films are light-absorbing as made, and are visibly bleached by the action of visible light. In addition, no chemical treatments are required for the development or preservation of the various bleaching effects which have been observed.

Conventional photographic materials could perhaps be used for optical information storage applications such as laser-implemented recording processes, but such materials undesirably require chemical development of the recording to amplify and fix the recording image. This characteristic renders them unsuitable for many optical recording applications. The requirements for a medium to be used for high density optical information storage have previously been defined, being described, for example, by R. A. Bartolini et al. in *IEEE Spectrum,* pp. 20–28 (August 1968). The obvious requirements are high writing sensitivity, high spot resolution and acceptable readout efficiency. Additional characteristics which are clearly desirable are a capability for reuse and the absence of any requirement for a post-exposure image intensification or fixing step.

Optical recording media comprising thin films of an evaporable metal, such as described by Bartolini et al., supra, satisfy most of these requirements but are not reusable. Another category of films which has been considered for optical recording includes the magneto-optic films such as MnBi, discussed by R. W. Cohen et al. in "Materials for Magneto-Optic Memories", *RCA Review,* Vol. 33, pp. 54–70 (March 1972). However, further improvements in the signal-to-noise ratios of these materials would be desirable.

SUMMARY OF THE INVENTION

The present invention has as its objective the production of a silver halide-containing film for optical recording which exhibits high writings sensitivity at a first or writing wavelength and high reading efficiency (combined with low writing sensitivity) at a second or reading wave-length. The film is both light-absorbing and optically bleachable at the first wavelength so that it may be efficiently bleached by a writing beam to produce a dichroic, birefringent image. On the other hand, the film is substantially less absorbing at the second wavelength, so that it efficiently transmits a low-level reading signal which can be analyzed for the effects of transmission through the film.

The above-described characteristics are provided in accordance with the invention by a visibly absorbing, optically bleachable inorganic film comprising multiple polycrystalline layers containing additively colored silver chloride crystals, the film providing a dichroic and birefringent image upon bleaching with visible light, and the bleached image being relatively non-absorbing and highly birefringent at light wavelengths in the near infrared. The film has a thickness not exceeding about 2 microns, permitting high spot resolution, and exhibits a visible light transmittance at 6300 Å not exceeding about 0.3 and an infrared light transmittance at 8500 Å of at least about 0.5 in the optically unbleached state. These characteristics permit the efficient coupling of visible bleaching energy into the film using, for example, He-Ne laser light (6328 Å) as a writing signal, and also efficient reading with, for example, 8200 Å Ga-As laser light. Advantageously, the additively colored silver chloride in the film is not significantly bleached at these infrared wavelengths, so that the images may be read without significantly altering the image pattern.

Films such as described may be directly used as optical information storage media if deposited on a suitable film support or substrate such as a sheet of transparent glass. In that case reading is accomplished using transmitted light. Preferably, however, the optical information storage medium will incorporate the film on a light-reflecting film support. This permits the utilization of the film in a reflection mode wherein both the writing and reading beams are reflected back through the film and thereby increase the efficiency of the writing and reading processes.

BRIEF DESCRIPTION OF THE DRAWINGS

The invention may be further understood by reference to the drawings, wherein.

DESCRIPTION OF THE PREFERRED EMBODIMENTS

Good writing sensitivity in optically bleachable silver chloride films comprising additively colored silver chloride crystals is a function not only of optical density at the bleaching wavelength but also the structure of the additively colored film. A multiple layer film wherein each layer in the film structure imparts some additive coloration to the whole offers significant advantages in terms of bleaching efficiency and bleached optical anistropy when compared with a single-layer film of the same optical density. Thus multiple silver chloride layers, which for the purposes of the present description means three or more layers, are considered an essential feature of the present films.

As noted in our copending, commonly assigned U.S. patent application, Ser. No. 901,428 filed May 1, 1978, which application is incorporated by reference herein for a full description of the fabrication of such films, a number of methods may be utilized to produce silver chloride layers comprising additively colored AgCl crystals. Generally, such methods involve the deposition of successive layers of polycrystalline silver chloride on a suitable substrate, treating each layer during or subsequent to deposition with a chemical agent which acts to partially reduce some of the silver chloride to metallic silver, and thus to impart additive coloration to each of the deposited layers. Vacuum evaporation is the preferred method for applying the polycrystalline silver chloride layers, and also for introducing in the silver chemical agents such as SiO, PbO, $SnO_2$, Au, $Ag_2S$, and the like which impart the additive coloration thereto.

Multilayer films produced in accordance with the above described methods, if optically bleached with polarized light such as polarized 6329 Å He-Ne laser light, exhibit very high dichroic ratios at and near the bleaching wavelength. Thus digital information stored in such films as bleached spots can suitably be read therefrom in a light transmission mode wherein polarized visible light is transmitted through the film and analyzed to detect the optical anistropy in the film.

However, these films normally exhibit a near-infrared transmittance which is too low for use in infrared detection systems, particularly where reflection mode reading is employed. The high infrared absorption of these films undesirably attenuates the reading signal, making detection difficult or necessitating the use of relatively high reading signal levels.

Figure 1:
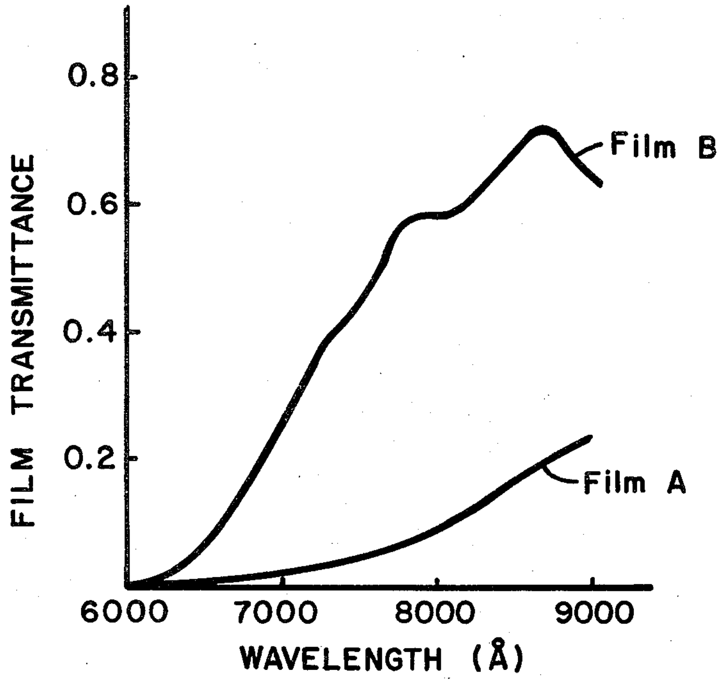
FIG. 1 plots film transmittance vs. light wavelength for two unbleached additively colored silver chloride films exhibiting different light absorption characteristics.

FIG. 1 of the drawing plots film transmittance as a function of wavelength for a typical unbleached film of the above-described type, labeled Film A, which consists of alternating vacuum-deposited layers of silver chloride and lead oxide. The film has an overall thickness of about 1.3 microns, including 40 silver chloride layers of 300 Å thickness alternating with 39 PbO layers of 20 Å thickness. The film has a transmittance at 8500 Å of about 0.17, and its measured writing sensitivity, expressed as the writing power necessary to obtain a 3:1 contrast ratio at 8500 Å between the bleached spot and the background, is in the range of about 200-500 mj/cm$^2$.

Two techniques have been developed according to the invention to provide multiple layer, additively colored silver chloride-containing films with both increased infrared transmittance and acceptable absorption in the visible range. In the first, a multiple layer film comprising alternating layers of PbO and AgCl, such as described above and characterized as Film A in FIG. 1 of the drawing, is heated to increase the transmittance of the film in the near-infrared range. The effect of this treatment on the film transmittance is shown by the curve labeled Film B in FIG. 1, which is a curve for Film A after that film had been heat-treated in air at 175° C. for 25 minutes. As can be seen from the Figure, Film B exhibits a transmittance at 8500 Å in excess of 0.7 while still retaining low transmittance at 6300 Å.

A second technique which can be used to provide films with increased infrared transmittance is that of reducing the amount of PbO incorporated into the film to impart additive coloration thereto. As the amount of PbO deposited on each polycrystalline silver chloride layer is reduced, the infrared transmittance of the completed film increases, so that adjustments in the about of PbO deposited can provide a film with both increased near-infrared transmittance and acceptable visible absorption.

The use of a reflection mode reading technique with near-infrared transmittance films such as Film B of FIG. 1 is advantageous because the reading signal is twice modified by the anisotropic regions in the film, first on the incident traverse and again on the reflected traverse. For example, the output intensity I of a reading signal of incident intensity $I_o$ transmitted through a birefringent medium having a birefringence δ with respect to the transmission axis is given by:

$$I=I_o(\sin \delta/2)^2$$

Since for small angles, sin δ/2 is proportional to δ/2, and since δ is proportional to the film thickness d, we can write:

$$I \propto I_o(d/4)$$

so that the output signal I increases as the square of the film thickness. Thus, for a film thickness of 1 micron, going from transmission mode to reflection mode reading increases the effective film thickness to 2 microns, and increases the output sensitivity by a factor of 4.

Figure 2:
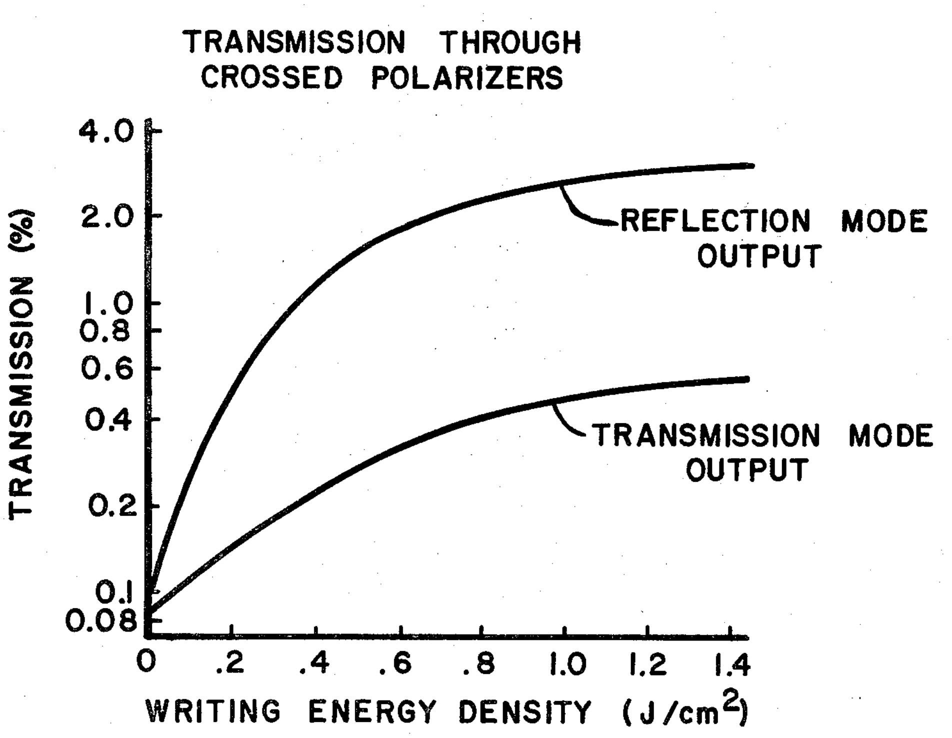
FIG. 2 plots light output, in terms of transmission through crossed polarizers, vs. writing energy density for a film provided according to the invention when used in each of the transmission and reflection modes.

This behavior is more clearly shown in FIG. 2 of the drawing, which plots output intensity (expressed in terms of signal transmission through crossed polarizers) vs. writing energy density for a film provided according to the invention when employed in each of the transmission and reflection modes. The horizontal axis is a scale of writing energy density, in J/cm$^2$, and is for the case of a 6329Å writing beam from a He-Ne laser. The vertical axis provides a scale of light transmission through a bleached film spot positioned between crossed polarizers in 8500Å reading light, and is a direct measure of the optical anistropy introduced into the film by the writing beam. At this reading wavelength, the bleached spot is not highly dichroic, and thus the level of transmitted light is approximately proportional to the level of birefringence induced in the bleached film.

As is evident from the Figure, output power is much higher, at the same writing energy, for the case of reflection mode writing and reading. Thus the use of the films of the present invention in reflection mode storge media is potentially preferred.

The following detailed examples more fully illustrate the manufacture of multilayer films and optical information recording media in accordance with the invention.

EXAMPLE I

A substrate consisting of a glass slide composed of a sode-lime-silica glass is selected for use as a film substrate. The slide is thoroughly cleaned and then positioned in a vacuum evaporation chamber above 2 tungsten evaporation boats, one containing a quantity of silver chloride and the other containing a quantity of PbO.

The vacuum chamber is evacuated to a pressure of about $10^{-6}$ torr and the tungsten boat containing silver chloride is electrically heated to vaporize some of the silver chloride therein. Heating is continued for a time sufficient to form a silver chloride layer about 300 Å in thickness on the surface of the glass slide.

After the silver chloride layer has been formed, the second tungsten boat containing PbO is electrically heated to cause vaporization of the oxide, with heating being continued until a PbO layer approximately 15 Å in thickness has been provided on the silver chloride layer.

The above-described steps of silver chloride deposition and PbO layer deposition are repeated until a multilayer film comprising 40 silver chloride layers separated by 39 PbO layers has been provided on the surface of the glass slide. The slide and film are then removed from the vacuum chamber and examined.

The deposited film is additively colored and demonstrates a rather broad absorption of visible light. The film exhibits a light transmittance of about 0.01 at 6300 Å and about 0.2 at 8500 Å, having a transmittance curve substantially as shown by the curve labeled Film A in FIG. 1 of the drawing.

The film and supporting glass slide are positioned in an oven operating at a temperature of about 175° C. and maintained therein for about 25 minutes. They are then removed and examined. The transmittance of the film at 6300 Å has increased to about 0.04, and at 8500 Å to about 0.65, the film having a transmittance curve substantially as shown by the curve labeled Film B in FIG. 1 of the drawing.

To determine the bleaching characteristics of this film, a spot on the film is optically bleached by a beam from a He-Ne laser (6329 Å) at an incident power density of 0.1 watts/cm$^2$ for a 7-second bleaching interval. The bleached spot is then examined in 8500 Å light between crossed polarizers to measure the transmittances of the bleached spot and background. The net transmission through the sytem of the spot location is 0.6%, while the background transmission (transmission through the polarizers and unrecorded silver) is about 0.1%. This provides a spot-background contrast ratio of 6:1. The calculated optically-induced birefringence of the bleached spot, expressed as the difference between the refractive index of the film in a direction parallel to the plane of polarization of the bleaching light and in a direction perpendicular thereto, is about 4.5° ($\delta/2$).

Figure 3:
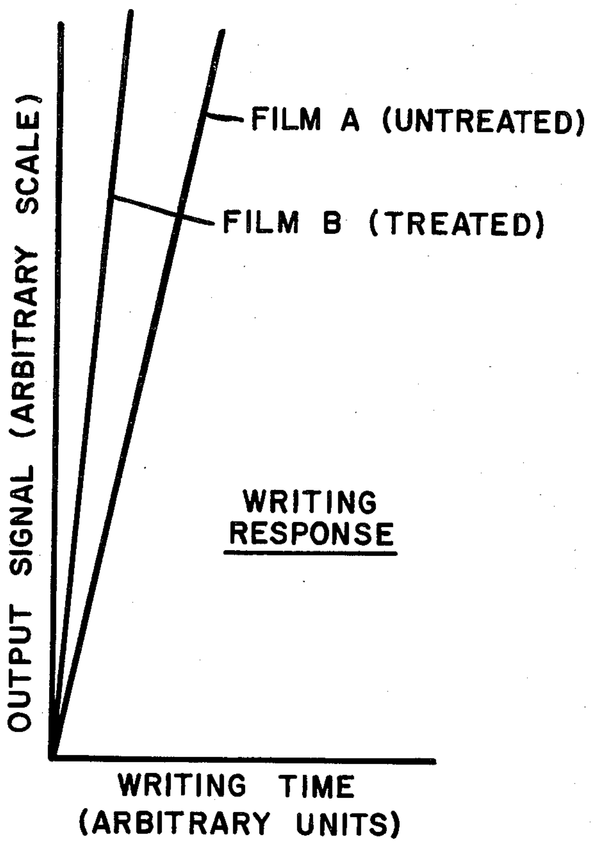
FIG. 3 plots, on an arbitrary scale, transmitted output signal vs. optical writing time for two films exhibiting differing optical bleaching sensitivity.

Unexpectedly, although the optical density of films such as described at the writing wavelength of 6329 Å is lower than that of layered PbO/AgCl films having high infrared absorption (e.g., Film A), the writing sensitivity of these more transparent films is increased by a factor of two or more as a result of the thermal bleaching treatment. This behavior is shown in FIG. 3 of the drawing which plots transmitted signal level as a function of writing (optical bleaching) time for both the heat-treated film (Film B) and the untreated film (Film A). Both signal level and writing time are on an arbitrary scale, but the substantially faster response time of treated Film B during bleaching is evident.

EXAMPLE II

An additively colored multilayer AgCl/PbO film suitable for use as an optical information storge medium is deposited on a glass slide by the sequential vacuum deposition of AgCl layers and PbO layers in accordance with the procedure of Example I. However, in order to reduce the near-infrared absorption of the film as made, the thickness of each of the PbO layers incorporated into the film is reduced from about 17 Å to about 9 Å during the deposition process.

The vacuum deposition procedure is continued until 40 AgCl layers of 300 Å thickness and 39 PbO layers of 9 Å thickness have been deposited on the glass slide. The slide and deposited film are then removed from the vacuum deposition chamber and examined.

The film is additively colored as made, exhibiting broad absorption of visible light and having a transmittance at 6300 Å of about 0.26. In addition, the transmittance of the film at 8500 Å is about 0.70, rendering it suitable for use in a reflection mode optical information storage system if desired.

The film exhibits good writing sensitivity at a bleaching wavelength of 6329 Å. It demonstrates a bleached spot transmission (through crossed polarizers) of about 0.75% and a bleached spot/background contrast ratio of about 7.5:1 at a reading wavelength of 8500 Å following bleaching at 6329 Å for 0.6 milliseconds at an incident power density of 1000 watts/cm$^2$.

EXAMPLE III

An optical information recording medium suitable for use in the reflection mode may be provided by applying a film such as described in Example II above to a film substrate comprising a light reflecting layer which reflects the reading and writing signals back through the film. To produce such a medium, a clean glass slide such as employed for a film substrate in Example I is provided with a light reflecting layer consisting of a 1000 Å thick silver film, applied by a conventional evaporation technique to the glass surface.

To prevent interactions between this layer and the optically sensitive silver chloride film, an optional transparent barrier layer, composed of a thin metal oxide film, is deposited over the silver film. This barrier is a film of $Ta_2O_5$ about 500 Å in thickness, applied over the reflecting layer by a conventional electron beam evaporation technique.

After the glass slide has been provided with light reflecting and barrier layers as described, a multilayer additively colored AgCl/PbO film is applied over these layers using the vacuum deposition method employed in Example 1. The procedures of Example I are followed until 40 layers of AgCl, each 300 Å in thickness, and 39 alternating layers of PbO, each 9 Å in thickness, have been applied over the barrier layer.

Figure 4:
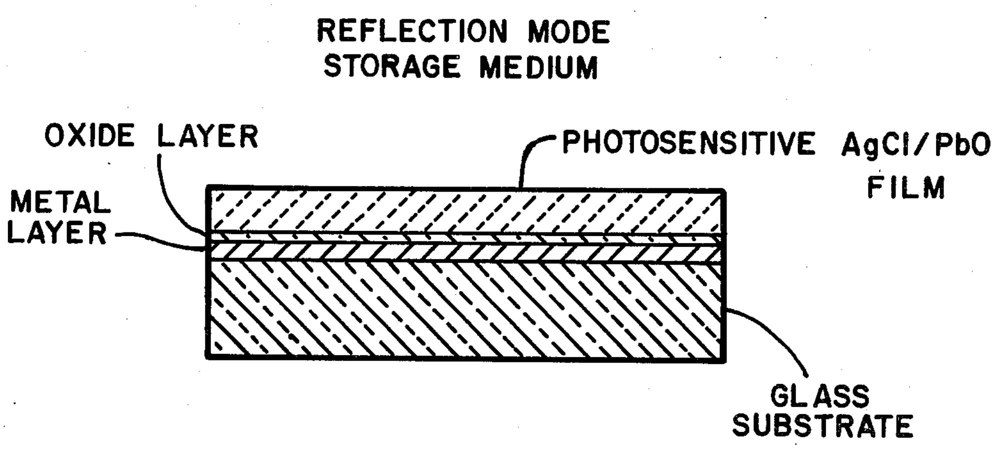
FIG. 4 is schematic illustration in cross-section of an optical information stroage medium provided according to the invention.

The product of this process has a structural configuration substantially as schematically illustrated (not to scale) in FIG. 4 of the drawing. That structure comprises a 1.3-micron photosensitive multiayer film disposed on a 500 Å oxide barrier layer, disposed in turn on a 1000 Å reflecting metal layer and underlying 2 mm. glass substrate.

The supported additively colored film thus provided is tested to determine the optical bleaching characteristics thereof. A spot on the film is bleached with 6329 Å bleaching light from a Ag-Ne laser at an incident power density of 1000 watts/cm$^2$ for a bleaching interval of about 0.6 milliseconds. The bleached spot is then examined with an analyzer in polarized 8500 Å reading light to determine the level of optical anistropy in the bleached spot. The net transmission is about 1.8% at 8500 Å, which provides a contrast ratio of about 18:1 against the 0.1% transmission level of the surrounding background.

The writing characteristics of this film are more fully illustrated in FIG. 2 of the drawing, wherein the curve identified as reflection mode output plots the output transmittance of the film at 8500 Å as a function of the bleaching energy (at 6329 Å) used to write information into the film. The figure compares the writing characteristics of the film, written and read in the reflection mode as above described, with the writing characteristics of a multilayer AgCl/PbO film of similar composition and structure, but deposited on a transparent glass slide and written and read in the transmission mode. It is apparent from a study of the figure that, at any given writing energy, the output signal level has measured by the 8500 Å transmittance of the film through crossed polarizers is increased by more than a factor of 4 ingoing from the transmission to the reflection use mode.

Based on performance characteristics such as above described, photosensitive films comprising alternating layers of AgCl and PbO, and having, in combination, a transmittance at 6300 Å not exceeding about 0.3 and a transmittance at 8500 Å of at least about 0.5 in the unbleached state, are preferred for the production of optical information storage media in accordance with the invention. The preferred films will have a thickness in the range of about 0.5–2 microns, and will include at least 3 silver chloride layers comprising additively colored silver halide crystals, although a substantially higher number of layers may be employed provided the optical transmittance characteristics of the resulting film are not compromised. Through the proper adjustment of film deposition and composition parameters, films exhibiting a transmittance at 8500 Å of at least about 0.7 may be provided.

To produce an optical information storage medium for use in the transmission mode, these preferred films may, as previously noted, be deposited on a film substrate consisting of a transparent support, such as a glass sheet. To use the films as an optical information storage medium in the preferred reflection mode, however, the films are instead deposited on a light-reflecting support in the manner illustrated by Example II. This support or substrate may consist of any suitable supporting member having a light-reflecting layer deposited thereon, positioned between the support and the film. Optionally, a barrier layer consisting of a transparent metal oxide film is provided between the light reflecting layer and the film.

The light reflecting layer used with these films preferably consists of a film of a metal selected from the group consisting of Am and Ag, while the barrier layer may consist of a transparent film of a metal oxide selected from the group consisting of $SiO_2$, $Ta_2O_5$ and $MgF_2$. However other reflective layer materials and barrier layer materials may alternatively be used.

In addition to high writing sensitivity and enhanced near-infrared transmittance, films and film recording media provided in accordance with the present invention offer additional advantages for many optical recording applications. Most importantly, the films are reusable and may be erased and rewritten several times without substantially changing the recording characteristics thereof. In addition, since the reading process may be carried out at a wavelength different from the writing process, a relatively high power reading source may be used, if desired, to provide a high signal-to-noise ratio without risking the erasure of recorded information. Finally, a gray scale of optical density can be imparted by suitable control of the recording process, so that the films are also useful for analog recording applications.

We claim:

1. A visibly absorbing, optically bleachable inorganic film comprising multiple polycrystalline silver chloride layers containing crystals of additively colored silver chloride, having a thickness not exceeding about 2 microns, which exhibits, in the optically unbleached state, a light transmittance at 6300 Å not exceeding about 0.3 and a light transmittance at 8500 Å of at least about 0.5.

2. A multilayer photosensitive inorganic film having a thickness not exceeding about 2 microns and comprising alternating layers of PbO and AgCl, including at least three AgCl layers comprising additively colored AgCl crystals, wherein the film has, in the optically unbleached state, a light transmittance at 6300 Å not exceeding about 0.3 and a light transmittance at 8500 Å of at least about 0.5.

3. A film in accordance with claim 2 which has a thickness in the range of 0.5–2 microns.

4. A film in accordance with claim 3 which has, in the optically unbleached state, a transmittance at 8500 Å of at least about 0.7.

5. A optical information storage medium which includes a visibly absorbing, optically bleachable inorganic film disposed on a support for the film, said film: (a) comprising multiple polycrystalline silver chloride layers which comprise crystals of additively colored silver chloride; (b) having a thickness not exceeding about 2 microns; and (c) having, in the optically unbleached state, a light transmittance at 6300 Å not exceeding about 0.3 and a light transmittance at 8500 Å of at least about 0.5.

6. An optical information storage medium which includes a multilayer photosensitive inorganic film disposed on a film support, said film having a thickness not exceeding about 2 microns, comprising alternating layers of PbO and AgCl, and including at least three AgCl layers comprising additively colored AgCl crystals, wherein the film has, in the optically unbleached state, a light transmittance at 6300 Å not exceeding about 0.3 and a light transmittance at 8500 Å of at least about 0.5.

7. An optical information storage medium in accordance with claim 6 wherein the film support is a transparent glass sheet.

8. An optical information storage medium in accordance with claim 6 wherein the film support is a light-reflecting support.

9. An optical information storage medium in accordance with claim 6 wherein the film support consists of a supporting member comprising a light reflecting layer positioned between the member and the film.

[redacted]

ing light.

Even though films of the type described in the foregoing studies comprise light-alterable silver halide crystals, their characteristics are substantially different from the characteristics of conventional silver halide photographic films. Additively colored films are light-absorbing as made, and are visibly bleached by the action of visible light. In addition, no chemical treatments are required for the development or preservation of the various bleaching effects which have been observed.

Conventional photographic materials could perhaps be used for optical information storage applications such as laser-implemented recording processes, but such materials undesirably require chemical development of the recording to amplify and fix the recording image. This characteristic renders them unsuitable for many optical recording applications. The requirements for a medium to be used for high density optical information storage have previously been defined, being described, for example, by R. A. Bartolini et al. in *IEEE Spectrum,* pp. 20–28 (August 1968). The obvious requirements are high writing sensitivity, high spot resolution and acceptable readout efficiency. Additional characteristics which are clearly desirable are a capability for reuse and the absence of any requirement for a post-exposure image intensification or fixing step.

Optical recording media comprising thin films of an evaporable metal, such as described by Bartolini et al., supra, satisfy most of these requirements but are not reusable. Another category of films which has been

[redacted]

signal, and also efficient reading with, for example, 8200 Å Ga-As laser light. Advantageously, the additively colored silver chloride in the film is not significantly bleached at these infrared wavelengths, so that the images may be read without significantly altering the image pattern.

Films such as described may be directly used as optical information storage media if deposited on a suitable film support or substrate such as a sheet of transparent glass. In that case reading is accomplished using transmitted light. Preferably, however, the optical information storage medium will incorporate the film on a light-reflecting film support. This permits the utilization of the film in a reflection mode wherein both the writing and reading beams are reflected back through the film and thereby increase the efficiency of the writing and reading processes.

BRIEF DESCRIPTION OF THE DRAWINGS

The invention may be further understood by reference to the drawings, wherein:

FIG. 1 plots film transmittance vs. light wavelength for two unbleached additively colored silver chloride films exhibiting different light absorption characteristics;

FIG. 2 plots light output, in terms of transmission through crossed polarizers, vs. writing energy density for a film provided according to the invention when used in each of the transmission and reflection modes;

UNITED STATES PATENT AND TRADEMARK OFFICE

CERTIFICATE OF CORRECTION

PATENT NO. : 4,239,338 PAGE 1 OF 2

DATED : December 16, 1980

INVENTOR(S) : Nicholas F. Borrelli et al.

It is certified that error appears in the above-identified patent and that said Letters Patent are hereby corrected as shown below:

Column 1, line 53, change "recording" to -- recorded --.

Column 2, line 11, change "writings" to --writing--.

Column 3, line 5, change "stroage" to -- storage --.

Column 4, line 23, change "about" to -- amount --.

Column 5, line 1, change "storge" to -- storage --.

Column 6, line 11, "storge" should be -- storage --.

Column 6, line 67, "multiayer" should be -- multilayer --.

Column 4, line 43, "$I \propto I_o(d /4)$" should read -- $I \propto I_o(d^2/4)$ --.

Column 7, line 6, "Ag-Ne" should read -- He-Ne --.

Column 7, line 55, "Example II" should read -- Example III --.

Column 7, line 64, "Am" should read -- Au --.

UNITED STATES PATENT AND TRADEMARK OFFICE
CERTIFICATE OF CORRECTION

PATENT NO. : 4,239,338

DATED : December 16, 1980

INVENTOR(S) : Nicholas F. Borrelli et al.

It is certified that error appears in the above-identified patent and that said Letters Patent are hereby corrected as shown below:

Column 7, line 65, "oxide" should read -- compound --.

Signed and Sealed this

*Ninth* Day of *June 1981*

[SEAL]

*Attest:*

RENE D. TEGTMEYER

*Attesting Officer* *Acting Commissioner of Patents and Trademarks*